(12) United States Patent
Brenner

(10) Patent No.: US 7,707,230 B1
(45) Date of Patent: Apr. 27, 2010

(54) METHODS AND STRUCTURE FOR USE OF AN AUXILIARY DATABASE FOR IMPORTATION OF DATA INTO A TARGET DATABASE

(76) Inventor: Gary Brenner, 1305 Seventh St., Boulder, CO (US) 80302

( * ) Notice: Subject to any disclaimer, the term of this patent is extended or adjusted under 35 U.S.C. 154(b) by 1326 days.

(21) Appl. No.: 11/068,480

(22) Filed: Feb. 28, 2005

Related U.S. Application Data

(60) Provisional application No. 60/548,439, filed on Feb. 27, 2004.

(51) Int. Cl.
*G06F 7/00* (2006.01)
(52) U.S. Cl. ............... 707/803; 707/810; 707/999.1
(58) Field of Classification Search ............. 707/1, 707/100, 201, 803, 810, 999.1
See application file for complete search history.

(56) References Cited

U.S. PATENT DOCUMENTS

| | | | |
|---|---|---|---|
| 5,450,581 A * | 9/1995 | Bergen et al. ............. | 707/9 |
| 6,470,343 B1 | 10/2002 | O'Brien | |
| 6,473,673 B1 * | 10/2002 | Kleyman et al. ............ | 700/182 |
| 6,622,144 B1 | 9/2003 | Rush | |
| 6,747,649 B1 * | 6/2004 | Sanz-Pastor et al. ........ | 345/428 |
| 6,985,145 B2 * | 1/2006 | Knighton et al. ............ | 345/428 |
| 6,985,835 B1 * | 1/2006 | Etzion et al. ................... | 703/1 |
| 7,133,041 B2 * | 11/2006 | Kaufman et al. ............ | 345/419 |
| 7,149,677 B2 * | 12/2006 | Jayaram et al. .............. | 703/22 |

* cited by examiner

*Primary Examiner*—Miranda Le
(74) *Attorney, Agent, or Firm*—Duft Bornsen & Fishman LLP

(57) ABSTRACT

Methods and associated structures for improving streaming database translation by use of an auxiliary database to store supplemental information derived as a by-product of the importation process and to then update the target database of the importation process using the supplemental information so generated. The supplemental information may include information such as supplemental attributes that define additional joins to be created in the target database following importation. In particular aspects hereof applicable to GIS database applications, supplemental geometric information may be derived from the source database during the importation process and stored in the auxiliary database. Following completion of the importation, the target database may be updated to add the geometric information from the auxiliary database to the newly imported objects in the target database.

4 Claims, 5 Drawing Sheets

METHODS AND STRUCTURE FOR USE OF AN AUXILIARY DATABASE FOR IMPORTATION OF DATA INTO A TARGET DATABASE

RELATED PATENTS

This application hereby incorporates by reference and claims priority to earlier filed U.S. Provisional Patent Application Ser. No. 60/548,439 filed 27 Feb. 2004 and entitled AN AUXILIARY DATABASE FOR IMPORTATION OF DATA INTO A TARGET DATABASE.

BACKGROUND OF THE INVENTION

1. Field of the Invention

The invention relates generally to database management structures and techniques and more specifically relates to improved structures and methods for importation of data from a source database to a target database using an auxiliary database for retaining information not directly translatable in a streaming translation process from the source to the target database.

2. Discussion of Related Art

In general, databases store data with associated structure and information that relates the stored data to other stored data in the database and typically stores the data using indexing techniques and structures to permit rapid access to the data based on selected key or index values and attributes.

In a modern database, connections or joins between database elements may be as important as the field values of the elements. This is especially true in spatial databases, such as those used in conjunction with a Geographic Information System (GIS), or a Computer Aided Design or Drafting (CAD) Tool. For example, it is useful to record whether a particular item of equipment resides at a given street address. In a densely populated neighborhood, such information cannot be accurately indicated through physical proximity, so a logical join is required.

Another fact of modern commerce is that enterprises frequently translate data from one GIS or CAD Tool database to another. Currently, tools for translation are highly developed for smoothly transferring individual entity data, but require difficult programming steps in order to capture and translate join data. One of the main difficulties occurs during streaming translation of the data. In a streaming translation, when the first element of a joined pair is translated, its future partner does not yet exist in the target database. Somehow the connection to the partner must be indicated. It is a problem to recognize and annotate the target database with the various forms of joins and relationships that may be encountered in a streaming translation of the source database. A related problem is capture and update of geometric data during translation from one GIS or CAD Tool database to another. Geometric data is frequently joined to objects in both the source and target databases using a variety of techniques. The geometry data again must be temporarily stored in the target database, prior to its final expression in the target database.

Compounding the problem is the fact that in sophisticated databases a large variety of data structures are used to encode joins, including common field values, special tables, and pointers to locations in memory, to name a few. Some form of the connection data from the source database is stored temporarily in the target database. As presently practiced in the art, the means for storing such connection and geometric data was expansion of the target data model, a difficult and inefficient process. Moreover, after translation is complete, the expansion features of the target database have no further use, and may create inefficiency or expose trade secrets.

It is evident from the above discussion that a need exists for improved methods and structures for effective streaming translation of a source database to a target database.

SUMMARY OF THE INVENTION

The present invention solves the above and other problems, thereby advancing the state of the useful arts, by providing methods and associated structure for improved streaming translation of a source database to a target database using an auxiliary database. An object hereof is to provide processes for capturing join and geometric information from a source database during typical streaming translation, storing the captured information in an auxiliary database consisting of a few universal object classes, and recreating the join and geometry information in the target database. Another object hereof is conversion of join data into a simple standard form that is easily stored in one universal table of an auxiliary database. The source and target data models may be similar or different. In fact, it may be common that not only are the data models different but the very database management programs and structures may be wholly different products from different vendors.

DEFINITIONS

Since terminology in the database management arts is not consistent in the industry, a few terms are defined as follows for purposes of this patent application:

The data model of a database is the definition of the scope of entities that comprise the database. In the case of a relational database, it includes the list of tables, the names of the columns in each table and, most often, but not always, a description of the type of data that can be held in a column. For an object oriented database, it includes the list of object classes, the attributes of each object class, the possible links or relationships between members of various object classes, and descriptions of the type of data that can be held in each object attribute.

An object class (or class) is a collection of database entities that share a class name and at least the key attribute or attributes, also known as the key field or fields. An example is the class "pole"; it consists of all poles represented in the database. The term object table is used synonymously. The key field is a field that uniquely determines each member of the class. In other words, no two members of a class may have a common value in the key field. For object classes that employ multiple key fields, the combination of values in all key fields uniquely determine each member of the class. In other words, no two members of the class may have common values in all key fields.

An object instance (or instance) is one member of an object class. Throughout this application, and possibly unlike some common usages, the term object used by itself refers to an instance, not a class. An example is one particular pole in the pole object class. The term table row (or row) is used synonymously. The portion of the data model that defines the scope of one object class x, including its allowable links and relationships, is called the data model of x. For an instance y, the data model of y is the data model of the class of which y is a member.

A join is an encoding of a relationship between object instances in the same or different object classes; join data is any encoding of the existence of such a relationship.

In the context of discussion of importation of data from one database into another, the database receiving data is called the target database (or target) and its data model is called the target data model. In the same context, the database contributing data which is translated and inserted into the target database is called the source database (or source); its data model is called the source data model. In this context, the source database may also refer to a subset of the physical database contributing data which is translated and inserted into the target database, defined by some criteria known to the translator program, such as membership in the set of objects having geometries located within a specified geographic boundary or inclusion in some partition element of a data file, or other similar means.

The term translation from one database to another is meant to be synonymous with importation of one database to another.

In the context of discussion of data warehousing, the storage database is also called the target database (or target) and its data model is called the target data model. In the same context, the database contributing data which is stored in the target database is called the source database (or source); its data model is called the source data model.

An additional database that contains attributes for one or more object instances, such attributes which are not contained in the data model of the instance, is called the auxiliary database. In some embodiments such attributes may be stored in an additional table or object class contained in the target database; in other words, the auxiliary database may or may not be physically distinct from the target database. These attributes are called supplemental attributes. The instance is called the parent instance (or parent) of its supplemental attributes. Supplemental attributes include any type of database field, property or attribute, including, but not limited to text strings, numbers, and arrays. Similarly, the auxiliary database may also contain a table for holding additional geometrical attributes. These are called supplemental geometries. The term supplemental information refers to both supplemental attributes and supplemental geometries.

In the context of discussion of importation of data from a source into a target, an additional database that contains supplemental attributes and/or supplemental geometries for target instances, is an example of an auxiliary database.

A streaming data translation is a multi-step translation process from a source to a target in which only a subset of intermediate stages of translation data exists at any moment and in which intermediate stages of translation data normally do not survive after translation is completed. Any of these intermediate stages of data is called streaming data. An example is translation from an AutoCAD source to a Smallworld GIS target using the Smallworld FME Translator. In this translation, the FME part of the translator produces a sequence of output text strings, each of which in sent to a data port on a client computer. A contiguous group of these strings represents each instance from the source. The Magik language code part of the translator receives these strings and translates a suitable contiguous group into one target instance. The strings produced by the FME and Magik parts of the translator are normally not preserved after Smallworld FME Translator completes its use of a group of strings.

AutoCAD® is a trademark of AutoDesk, Inc., Smallworld®, Smallworld Magik® Smallworld FME Translator®, and Smallworld GIS® are trademarks of General Electric Corp. FME® is a trademark of Safe Software, Ltd., FRAMME® is a trademark of Intergraph Corp.

DETAILED DESCRIPTION OF THE DRAWINGS

Exemplary Importation

Figure 1:
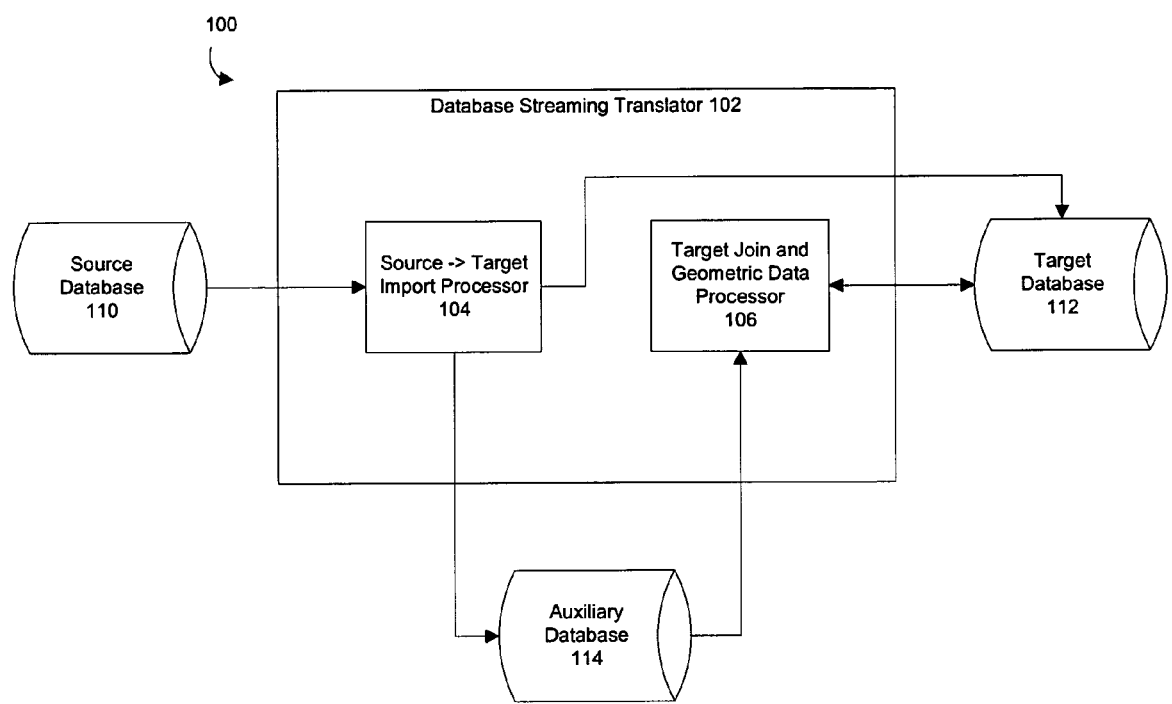
FIG. 1 is a block diagram of a system embodying features and aspects hereof for improved streaming translation of a source database into a target database using an auxiliary database.

Features and aspects hereof are most easily understood with the aid of exemplary applications. In particular, the following examples teach features and aspects hereof as applied to typical GIS database importation applications.

Example 1

In the first example, we show beneficial application of features and aspects hereof to improve the process of joining two objects that are translated into a Smallworld GIS database using the Smallworld FME Translator, a product provided by Safe Software, Ltd and General Electric to their customers. For the example, an instance of the pole class is joined to an instance of the address class in the source database, an AutoCAD database. The pole object in AutoCAD contains an attribute called autocad_entity_id and is associated with a pole_datablock object that contains an attribute called datablock_id. The address object also contains an attribute called autocad_entity_id. The values of the pole_datablock attribute datablock_id and address attribute autocad_entity_id are the same; for this example, they are both equal to 36912. By this means the join between the pole object associated with the pole_datablock and the address object is encoded in AutoCAD. Other means also have been used in this database and in many other databases for modeling a join between objects, some which do not include explicit attribute values. For example, it is possible to make use of an association table in the database that contains pointers to the members of a joined pair. In any case, the existing AutoCAD address attribute autocad_entity_id may be used and a new pole attribute address_id may be created. The values of these two attributes may be assigned to be the common value that is (1) calculated for the pole object (e.g., by taking the value of datablock_id for the pole_datablock associated with the pole object), and is (2) the value of the autocad_entity_id for the address object. This represents one example in accordance with features and aspects hereof for standardizing expression of joins. It will be readily recognized by those of ordinary skill in the art that it is always possible to encode a join using a new or existing attribute of the two objects, combined with an algorithm for finding the value of a new attribute, similar to the algorithm presented above for calculation of the value of pole attribute address_id.

The Smallworld FME Translator is a streaming translator that creates a pole object and an address object in Smallworld GIS corresponding to the pole and address objects in AutoCAD, respectively. It calculates the values of various attributes for the Smallworld pole and address, based on the values of attributes in the AutoCAD database. There are no autocad_entity_id or address_id attributes in the Smallworld GIS pole and address data models. However, other features and aspects hereof include modification of the translator code to render supplemental attributes. The supplemental attribute autocad_id is associated with pole and address and the supplemental attribute address_id is associated with pole in the auxiliary database. Modification of FME mapping files, described below, defines values of these attributes as equal to the corresponding attributes in AutoCAD.

The following table 1 illustrates an exemplary auxiliary database table for defining supplemental attributes populated for this example. This table contains four essential attributes or columns: Class Name, Unique Identifier, Attribute Name, and Attribute Value.

TABLE 1

| Supplemental Attribute Record Number | Class Name | Unique Identifier | Supplemental Attribute Name | Supplemental Attribute Value |
|---|---|---|---|---|
| 1 | pole | 123456 | autocad_id | 2468 |
| 2 | pole | 123456 | address_id | 36912 |
| 3 | address | 456789 | autocad_id | 36912 |

Table 1 represents an example of the universal object class or table for holding supplemental attributes. In this example, the data may be used to create an association between the pole and address objects.

In the example, an instance of the class pole is created in the Smallworld GIS target database. Its identifier in Smallworld GIS is 123456. According to features and aspects hereof, the supplemental attributes autocad_id and address_id are created and populated as soon as the instance is created in Smallworld. A little while later, the Smallworld FME Translator creates an instance of the class address whose identifier value is 456789 in Smallworld GIS and receives an attribute value 36912 for the supplemental attribute autocad_entity_id.

In accordance with prior techniques and structures, the process for preserving the join data encoding the pole/address join required creating an additional database containing the data models of the classes pole and address. The data model of the new database was extended to include attributes equivalent to the supplemental attributes in the classes pole and address, the instances were translated into the new database and finally the translated instances were copied into the target database and joined in the target.

A redaction of a section of exemplary FME mapping files that convert data from AutoCAD pole object data to Smallworld GIS pole object follows:

```
SWORLD_DEF POLE                                    \
    location              sworld_point             \
    pole_no               char(40)                 \
    construction_status   char(10)                 \
    external:autocad_id       char(80)             \
    external:address_id       char(80)             \
```

-continued

```
FACTORY_DEF * TeeFactory                                   \
    FACTORY_NAME "POLE -> POLE Correlator"                 \
    INPUT FEATURE_TYPE POLE                                \
    OUTPUT FEATURE_TYPE POLE                               \
    multi_writer_id 1                                      \
    @Transform(FME_GENERIC,SWORLD)                         \
    @CopyAttributes(pole_no, pole_number)                  \
    @SupplyAttributes(construction_status, "IN SERVICE")\
    @CopyAttributes(external:autocad_id, autocad_entity_id)    \
    @CopyAttributes(external:address_id, datablock_id)         \

FACTORY_DEF * TeeFactory                                   \
    FACTORY_NAME "POLE_DATA - Set attributes
    from block"                                            \
    INPUT FEATURE_TYPE POLE_DATABLOCK                      \
    OUTPUT FEATURE_TYPE *                                  \
      POLE_NUMBER @TCL("string trim \"_POLE\" ")           \

FACTORY_DEF * TestFactory                                  \
    FACTORY_NAME "POLE TEST"                               \
    INPUT FEATURE_TYPE POLE                                \
    INPUT FEATURE_TYPE POLE_DATABLOCK                      \
      TEST &autocad_entity = autocad_point                 \
      TEST &autocad_entity = autocad_insert                \
    BOOLEAN_OPERATOR OR                                    \
    OUTPUT PASSED FEATURE_TYPE *                           \
    OUTPUT FAILED FEATURE_TYPE unknown
```

The Smallworld FME translator consists of an FME module and a Magik language module. The FME module, whose operations are controlled by FME mapping files, converts source data into a series of strings that are passed to the Magik module. The Magik module further processes the strings and loads corresponding objects into the target Smallworld GIS database. A list of "pseudo-code" steps specific to this exemplary translation is next provided and encompasses the Smallworld FME Translator with modification specific to this invention process for translation of the set of pole objects in the source.

Step 1.

In the FME module of the translator, encode a data model description for the pole object in a series of strings that are transmitted to the Magik module. The SWORLD_DEF part of the mapping file causes creation of strings that encode the object attributes. By reading the SWORLD_DEF portion of the example FME code, these attributes are seen to be defined:

1. a geometric point attribute called location
2. a character string of at most 40 characters called pole_no
3. a character string of at most 10 characters called construction_status
4. a character string of at most 80 characters called external:autocad_id
5. a character string of at most 80 characters called external:address_id Step 2.

The Magik module reads the series of strings and stores a definition of the attributes of the pole object. The module compares the attribute definitions to the data model of the pole class in Smallworld GIS. It issues a warning for attribute names that do not match actual names of attributes of the pole object class in the Smallworld GIS database. In practice, none of the attributes of a pole begin with the substring "external:" and warnings are issued.

Step 3.

The FME module begins processing one pole object in the source by gathering source objects that contribute attributes to the pole. This behavior is controlled by the "FACTORY_DEF*TestFactory" part or parts of mapping files. For this example the objects returned are pole and pole_datablock.

Step 4.

The FME module calculates attribute values and encodes them as output strings. This behavior is controlled by the "FACTORY_DEF*TeeFactory" part or parts of mapping files. For this example, the value of attribute external: autocad_id is copied from the source pole object's autocad_entity_id value, and the construction_status attribute value is set to the constant value "IN SERVICE".

Step 5.

The FME module sends attribute value strings for one pole object to the Magik module.

Step 6.

The Magik module receives and processes strings for one pole object. It creates a pole in Smallworld GIS database and filters incoming attribute strings. Strings that correspond to attributes whose names begin with the substring "external:" are loaded into the auxiliary database as supplemental attributes; all others are loaded in the target Smallworld GIS database as attributes of the just-created pole object.

Step 7.

Repeat steps 3-6 until all poles in the source are processed.

Following the conclusion of importation of data from AutoCAD via the Smallworld FME Translator, execution of computer code in Magik creates the join between the pole and address.

Magik is an object oriented language with syntax resembling more well-known object oriented languages such as Java, Smalltalk and Python. A simplified Magik code method that joins the pole and address in Smallworld GIS follows.

```
_method pole.find_and_join_address( )
    address_id_value <<
        _self.supplemental_attribute_value("address_id")
    answer <<
        :address.find_all_matches( "autocad_id",
        address_id_value )
    result << answer.an_element( )
    _self.join_address( result )
_endmethod
```

A pseudo-code description of the algorithm expressed by this Magik method follows.

Step 1.

Begin with a pole instance, pole(X).

Step 2.

Retrieve the value of pole(X) supplemental attribute address_id. Set the variable "address_id_value" to this value.

Step 3.

Construct the set of all address objects in the Smallworld GIS that satisfy supplemental attribute "autocad_id" has value equal to the value of variable address_id_value.

Step 4.

Extract one element of the set constructed in Step 3.

Step 5.

Join the object calculated in Step 4 to pole(X)

For this example the Magik code method operates on the pole object with Smallworld id 123456; and value 36912 is returned in Step 2. The Magik method find_all matches( ) sent to :address, with arguments autocad_id and 36912 returns all address objects in the Smallworld database whose supplemental attribute autocad_id has value 36912. In this example a set consisting of the address object with Smallworld id 456789 is returned. The Magik method join_address( ) sent to pole:123456 with argument address:456789 joins pole: 123456 to address:456789.

Example 2

Example 2 is an exemplary embodiment of features and aspects hereof for creating and modifying geometries in a Geographic Information System using a universal table for holding supplemental geometries. For the example, a count object's text field is moved to the location that the corresponding count object occupied in the source database. The source database is a FRAMME database and the count object is located nearby an address object. Address and count objects are translated to the target, a Smallworld GIS database. In this conversion the FME mapping file directs construction of the supplemental geometry as if it were an ordinary object in the target database.

A redaction of a section of FME mapping files that creates a supplemental geometry gen_anno object in the auxiliary Smallworld GIS database as a side-effect of translation of an AutoCAD count object to a Smallworld GIS count object follows:

```
SWORLD_DEF GEN_ANNO                              \
    text                     sworld_text         \
    leader_line              sworld_chain        \
    class                    char(40)            \
    attribute_name           char(40)            \
    key_field1               char(40)            \
    key_field2               char(40)            \
    external:no_mdus         char(80)            \
.
.
.
FACTORY_DEF * TeeFactory                                \
    FACTORY_NAME "COUNT -> GEN_ANNO Correlator"         \
    INPUT FEATURE_TYPE POLE                             \
    OUTPUT FEATURE_TYPE GEN_ANNO                        \
        multi_writer_id 1                               \
        @Transform(FME_GENERIC,SWORLD)                  \
        @SupplyAttributes(class, "count") \
        @SupplyAttributes(field, "primary_text")        \
        @SupplyAttributes(key_field1, rb_prmry )        \
        @SupplyAttributes(key_field2, rb_scndry )       \
        @SupplyAttributes(sworld_geometry{0}.sworld_name,text )  \
        @SupplyAttributes(sworld_geometry{0}.sworld_type,
        sworld_text )                                   \
        @SupplyAttributes(sworld_geometry{0}.sworld_text_height,
        1 )                                             \
.
.
```

A pseudo-code expression of an exemplary algorithm for construction of the gen_anno objects as side effects of translation of a count object by the Smallworld FME translator follows:

Step 1.

In the FME module of the translator, encode a data model description for the count object class in a series of strings that are transmitted to the Magik module. The SWORLD_DEF part of the mapping file causes creation of strings that encode the attributes of the count object class.

Step 2.

In the FME module of the translator, encode a data model description for the gen_anno object class in a series of strings that are transmitted to the Magik module. The SWORLD_DEF part of the mapping file causes creation of strings that encode the attributes of the count object class.

Step 3.

In the FME module of the translator, encode attribute information for the current count object in the source database. Encoded attributes are sent to the Magik module and a count object is inserted by the Magik module into the Smallworld GIS database.

Step 4.

In the FME module of the translator, "FACTORY_DEF*TeeFactory" portion of the mapping files named "FACTORY_NAME COUNT→GEN_ANNO Correlator" triggers generation of encoded attributes for a gen_anno object. The attributes encoded include:
1. class
2. field
3. key_field1
4. key_field2
5. text Step 5.

Encoded strings for the values of the attributes of the gen_anno object are sent to the Magic module. A gen_anno object is created and placed into the auxiliary database. Strings are filtered and the ones that begin with the substring "external:" are loaded in the auxiliary database as supplemental attributes, others are also loaded into the auxiliary database, however as ordinary attributes of the gen_anno.

Step 6.

Repeat Steps 3-5 until all count objects in the source database are processed.

A straight-forward modification of the manufacturer delivered version of Smallworld FME Translator detects that the object class known as gen_anno triggers construction of a universal geometry object in the auxiliary database, instead of such an object in the target database. In the example, the gen_anno object created in the auxiliary database contains fields key_field1 and key_field2.

TABLE 2

| class name | key_field1 | key_field2 | text | leader_line |
|---|---|---|---|---|
| count | SP102 | BD2200 | A Smallworld Text | A Smallworld Chain |

Table 2 is an example of part of the universal object class or table for holding geometric data. In this example, the object class gen_anno is defined in a Smallworld GIS database, which can store a Smallworld Text or Chain geometry as the value of one of the object's attributes. The attribute called text has as its value a Smallworld text object. This data may be used to relocate the text geometry of a count object.

For this example, the FRAMME database contains a count object and an address object whose rb_prmry and rb_scndry agree, with rb_prmry value equal to SP102 and rb_scndry value equal to BD2200. The Smallworld FME translator translates data from the FRAMME database into a Smallworld GIS database. During translation of the address object from FRAMME to Smallworld, a count object is automatically inserted in the Smallworld database as a side effect of inserting the address object. In the same process it is also automatically joined to the address. The address object receives supplemental attributes rb_prmry and rb_scndry, with values the same as in the FRAMME database. As can be seen in table 2, a gen_anno object is generated in the Auxiliary database with key_field1 value equal to SP102 and field2_value equal to BD2200. The original position of the count in the FRAMME database is expressed as part of the Smallworld text object that is also stored in the gen_anno object. The count object that has been automatically created in the Smallworld GIS database may be moved to the position relative the address that its predecessor in FRAMME occupied relative to the address object in FRAMME.

A redaction of a section of Magik code that moves the count object in Smallworld GIS follows.

```
_method address.adjust_count( )
    rb1 << _self.supplemental_attribute_value( "rb_prmry" )
    rb2 << _self.supplemental_attribute_value( "rb_scndry" )
    gen_annos1 << :count.gen_annos_matching( "key_field1",
rb1 )
    gen_annos2 << :count.gen_annos_matching( "key_field2",
rb2 )
    anno << gen_annos1.intersection( gen_annos2 ).an_element( )
    text_template << anno.text
    cnt << _self.count
    cnt.unset_geometry( :text )
    # Now make the annotation using gen-anno's data
        cnt.make_geometry( :text, text_template.sectors,
        text_template.string_buffer,
        text_template.orientation,
        text_template.justification,
        unset,
        text_text_template.height )
_endmethod
$
```

This Magik code begins with the address object that has been inserted in Smallworld GIS database. The Magik method supplemental_attribute_value( ) applied twice to the address object with arguments rb_prmry and rb_scndry determines the values of address object supplemental attributes rb_prmry and rb_scndry. The values are SP102 and BD200 respectively. These values are used by the method gen_annos_matching( ) to find the gen_anno objects that satisfy (1) the class_name value is :count, the key_field1 value is SP102 and the key_field2 value is BD2200. There is only one such gen_anno object in the set, which is retrieved from the set by the method an_element( ). The Magik method called text applied to this gen_anno returns the text geometry of the gen_anno object, represented by variable text_template in the method, which is located in the desired position for the count object that was previously inserted to the Smallworld GIS database and joined to the address. The remainder of the method retrieves the count object, removes its text geometry using method unset_geometry( ) and adds the correct geometry using the method make_geometry( ) with data supplied by text_template. Thus the count object is repositioned with the desired x-y coordinates, angle (orientation), justification, height and string buffer (text string).

More broadly, the features and aspects hereof may be understood with reference to the generalized system and methods of processing as exemplified above.

FIG. 1 is a block diagram of a system 100 embodying features and aspects hereof to improve a streaming translation process to import data from the source database 110 to a target database 112, each having its own distinct data model. Database streaming translator 102 includes a source database to target database import processor 104 to import data from source database 110 into target database 112. Supplemental attribute information and geometric attribute information generated during the importation by source to target import processor 104 is added to auxiliary database 114 for later processing to update information in target database 112 following completion of the importation process. When import processor 104 completes its importation processing, target join and geometric data processor 106 is operable to retrieve supplemental information from auxiliary database 114 and to update accordingly join and geometric information in target database 112.

Those of ordinary skill in the art will recognize that in various applications, the auxiliary database 114 created by import processor 104 may include supplemental attributes, or supplemental geometries, or both. In particular, in GIS database importation applications as exemplified above, it may be common for both supplemental attribute information associated with joins in the source database 110 and geometric attribute information associated with objects in source database 110 to be generated and stored in the auxiliary database 114. The join and geometric data processor 106 therefore updates target database 112 following importation of standard objects to create desired joins in the target database and to update geometric information in the target database not readily updated or translated by the importation process of standard objects from source database 110.

Further, those of ordinary skill in the art will readily recognize that the processing performed by database streaming translator 102 may be integrated within a single computing system or may be distributed over a network of computing systems utilizing well-known distributed processing structures and techniques. Further, source database 110, target database 112, and auxiliary database 114 may be stored within a single storage subsystem associated with the one or more computing systems or may similarly be distributed over a network of associated storage subsystems utilizing well-known distributed storage management structures and techniques. Such design choices for integrating or distributing processing and data among one or more computing and storage subsystems are well known to those of ordinary skill in the art.

Figure 2:
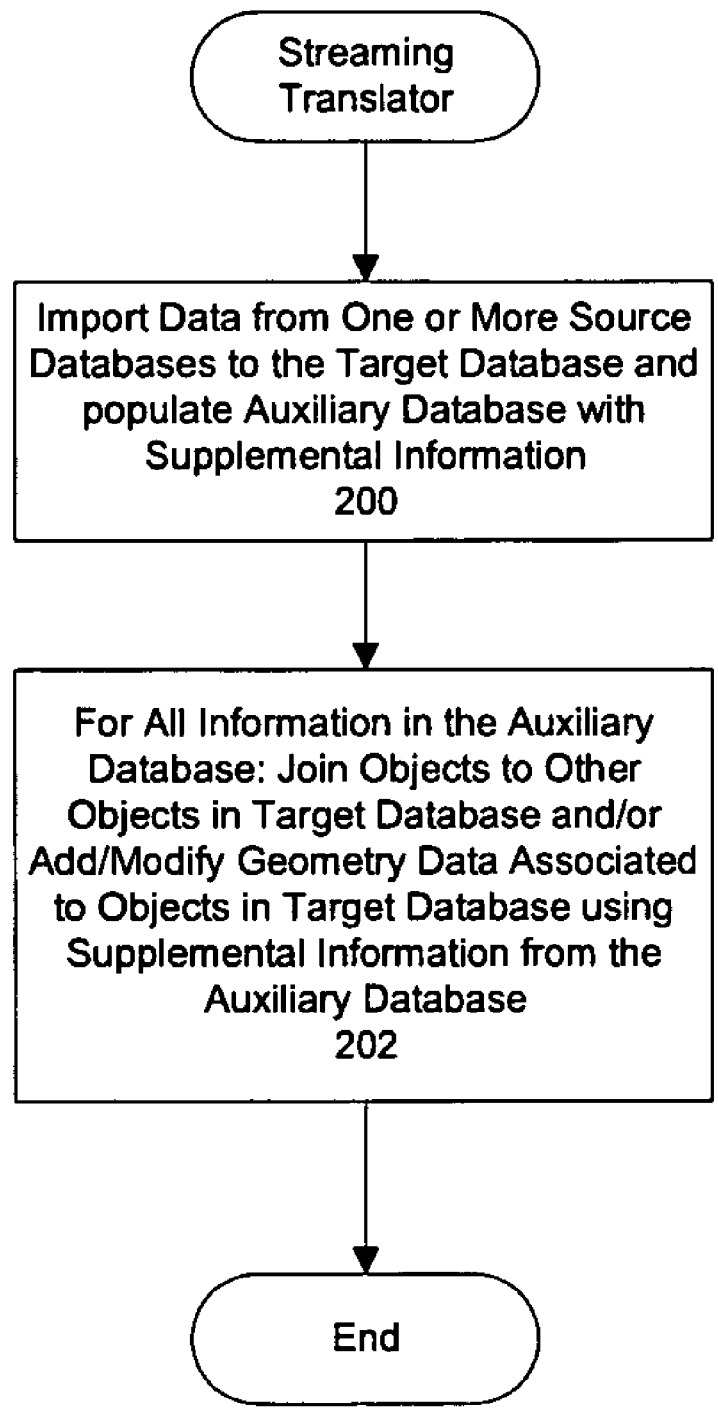
FIG. 2 is a flowchart describing a process in accordance with features and aspects hereof for improved streaming translation of a source database into a target database using an auxiliary database.

FIG. 2 is a flowchart describing the highest level processing performed within a database streaming translator in accordance with features and aspects hereof. Element 200 is operable to import standard objects from one or more source databases into the target database in accordance with the data model associated with each database. Supplemental information derived from, or otherwise associated with, objects in the one or more source databases is generated and stored within an auxiliary database in accordance with features and aspects hereof. As noted above, such supplemental information may include, for example, join information joining objects within a source database in a manner not directly translatable into the target database and may include geometric information associated with an object in the source database that may require further translation for eventual storage in the target database. Such join information and/or geometric information may be temporarily stored or encoded in the auxiliary database and when stored or encoded in the Auxiliary Database is collectively referred to as supplemental information. The processing to restore such join information and/or geometric information in the target database may be performed subsequent to the processing of element 200 to import the one or more source databases into the target database.

Having completed the importation of standard objects from the one or more source databases into the target database, supplemental information generated by element 200 stored in the auxiliary database may then be processed by element 202. Element 202 is operable iteratively on a selection of objects from the target database. Each element of supplemental information in the auxiliary database contains references to objects stored in the target database or auxiliary database. For each object in such selection from the target database, such references contained in supplemental information may be used to locate a join partner for the object or supply geometric information for updating the object or an associated object in the target database. Although the format and semantic content of the supplemental information in the auxiliary database may be substantially standardized, those of ordinary skill in the art will recognize the utility of customizing the processing of element 202 for the particular source databases and target database utilized in a particular application environment. Particular exemplary formats and processing are discussed above with respect to particular, common, GIS application database importation structures and processes.

Figure 3:
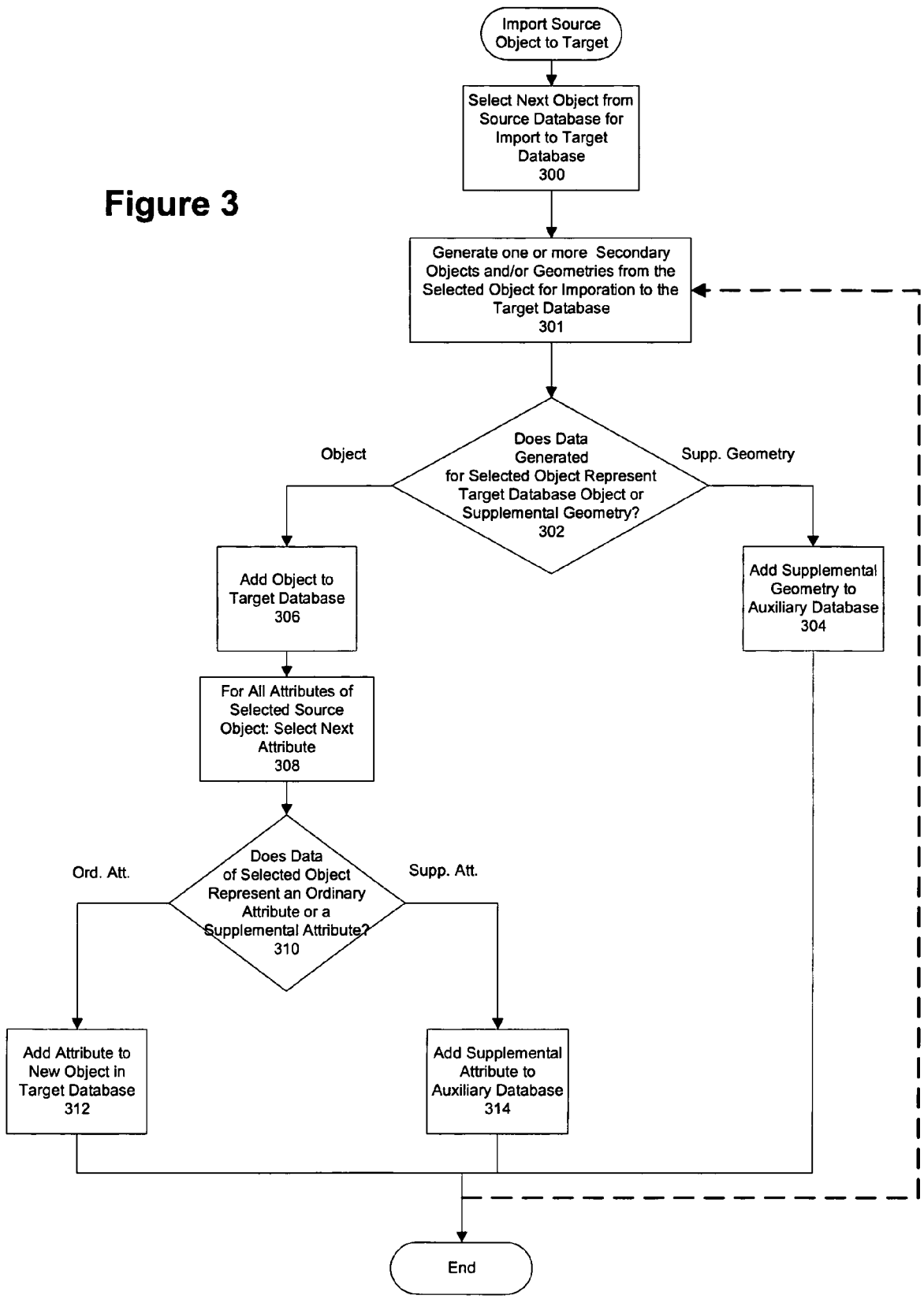
FIG. 3 is a flowchart providing additional details of an exemplary process embodying features and aspects hereof to import an object from the source database to the target database in conjunction with the auxiliary database.

FIG. 3 is a flowchart providing additional details of the processing of a single object imported from the source database to the target database (as discussed above in element 200 of FIG. 2). Element 300 is first operable to select the next primary object from the source database intended for importation to the target database. Element 301 generates data sets encoding one or more secondary objects and/or supplemental geometries derived from the primary object, iteratively outputting each data set to element 302. With each output of a data set to element 302, control passes to element 302. The iterative operation is indicated by the darker dashed arrow from following element 314 back to element 301 to continue processing until all of the one or more secondary objects and/or supplemental geometries has been generated and processed from the one selected source object.

Following completion of operable element 302 and its dependent operable elements (elements 304, 306, 308, 310, 312 and 314), control passes back to element 301, which continues outputting a data set to element 302 until all data sets encoding secondary objects derived from the primary object are exhausted. At that point, higher level processing described above with respect to FIG. 2 continues processing other objects form the source database until all source database objects have been imported to the target database.

When control passes to element 302, it then determines whether the next selected data set encoding a secondary object or supplemental geometry represents a supplemental geometry to be saved in the auxiliary database for later access to update the target database following importation of all other objects. If so, element 304 is operable to add to the auxiliary database a supplemental geometry. Processing of this selected data set encoding a secondary object is then complete and control passes back to element 301, which generates the next data set encoding a secondary object or supplemental geometry and passes control back to element 302.

If element 302 determines that the next selected data set encoding a secondary object or supplemental geometry does not represent a supplemental geometry, but rather represents an object to be imported into the target database, processing continues at element 306. Element 306 is operable to add the next selected data set encoding a secondary object as a new object in the target database elements 308 through 314 are then iteratively operable for all attributes associated with the current data set encoding a secondary object newly imported into the target database. For each such attribute value, element 310 is operable to determine whether the next selected attribute of the newly imported object is an ordinary attribute to be recorded in association with the newly imported object in the target database or a supplemental attribute that and hence temporarily saved in the auxiliary database. If the next selected attribute of the newly imported object is an ordinary attribute to be recorded in the target database in accordance with the target data model, element 310 is operable to appropriately record the attribute value in association with the newly imported object in the target database. Such relationships between attributes and objects are well known to those of ordinary skill in the database arts. Processing then continues iteratively repeating elements 308 through 314 until all other attributes of the newly imported object have been processed.

Figure 4:
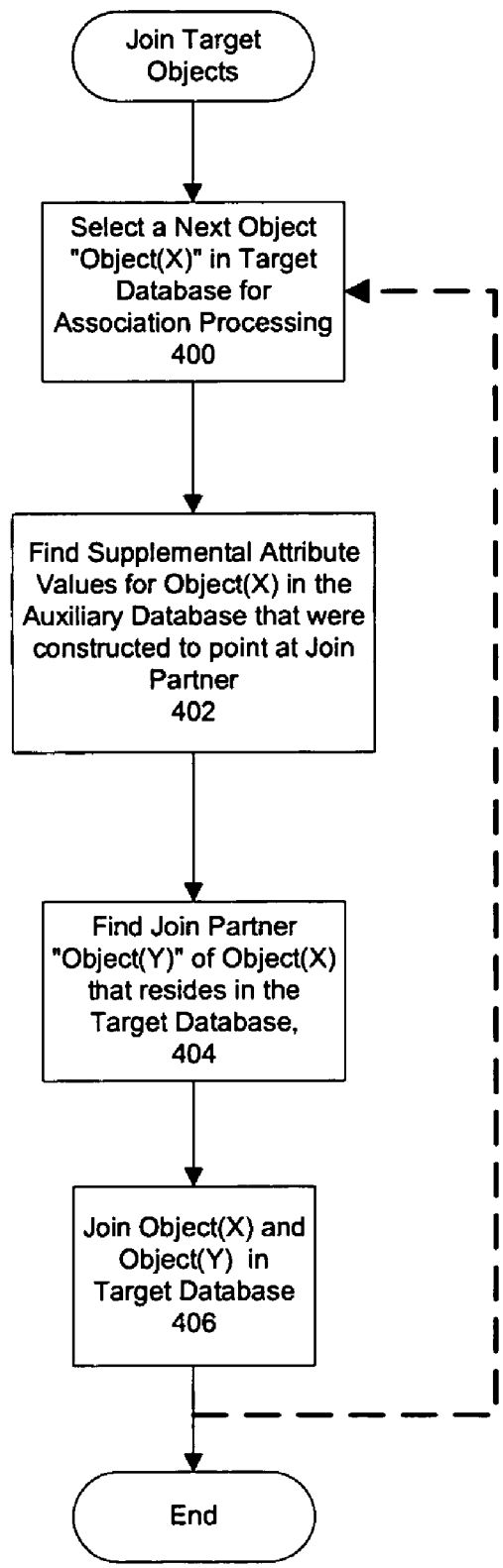
FIG. 4 is flowchart describing additional details of an exemplary process embodying features and aspects hereof to process join information in the auxiliary database to update the target database after importation.

If the element 310 determines that the next selected attribute of the newly imported object represents supplemental attribute information, such information cannot be recorded within the data model of the target database but rather may be used to process objects in the target database following completion of the importation of all ordinary objects from the source database to the target database. Element 314 is therefore operable to add this next selected attribute as a supplemental attribute in the auxiliary database for later use processing object of the target database following completion of the importation of all ordinary objects from the source database to the target database. As above, processing then continues iteratively repeating elements 308 through 314 until processing of all attributes of the newly imported object is completed. Upon completion of processing of all attributes of the newly imported object, importation of this newly imported object is completed and processing continues as discussed above with control passing to element 301. FIG. 4 is a flowchart describing additional details of operations described above with respect to FIG. 2 to create appropriate joins in the target database following completion of importation of all objects from the source database to the target database. The processing of FIG. 4 therefore represents exemplary processing to create such additional joins in the target database based upon supplemental attribute information saved in the auxiliary database and generated as a by-product of the importation processing described above. In general, join processing of FIG. 4 is operable by beginning with selection of a group of objects in the target database, usually by class name and other criteria, such as geographic location. The processing continues by iteratively repeating the steps described in FIG. 4 for each object of the selected group. For each such object, associated supplemental attribute values are located in the auxiliary database and appropriate joins are created between the object and another object in the target database identified by the supplemental attribute information so located. The target database is thus updated to create all join information derivable from the source database through processing of the auxiliary database created as a by-product during the import processing.

Element 400 is first operable to select the next object referred to herein as Object(X). The next object is selected from the target database as a next object of a selected set of target database objects. Element 402 is then operable to locate supplemental attribute values associated with Object(X) in the auxiliary database constructed during the importation process to point at an associated join partner associated with Object(X) based upon the supplemental attribute values. Element 402 locates one or more such supplemental attribute values associated with Object(X). Element 404 then locates other supplemental attributes in the target database that intersect supplemental attributes found by element 402. A chain of intersecting supplemental attributes may be generated in such a manner resulting in a supplemental attribute pointing to the identified join partner referred to herein and as Object(Y). Element 406 then joins Object(X) and Object(Y) by generating a new join relationship in the target database which may be similar to a related join in the source database based upon the supplemental attribute values located by element 402 in the auxiliary database joining the two objects. Thus, processing of FIG. 4 recreates a join of Object(X) and Object(Y) in the target database which may be similar to a related join of the original objects in the source database but rather derived from the auxiliary database supplemental information generated through the importation processing. Processing of FIG. 4 may create a join of Object(X) and Object(Y) in the target database for which no analogously related join of the original objects exists in the source database, and derived from the auxiliary database supplemental information generated through the importation processing. Iterative repetition of the processing of FIG. 4 (as indicated by the darker dashed arrow) performs similar processing for each object in the target database until all joins identified by supplemental attribute information in the auxiliary database have been recreated in the target database.

Figure 5:
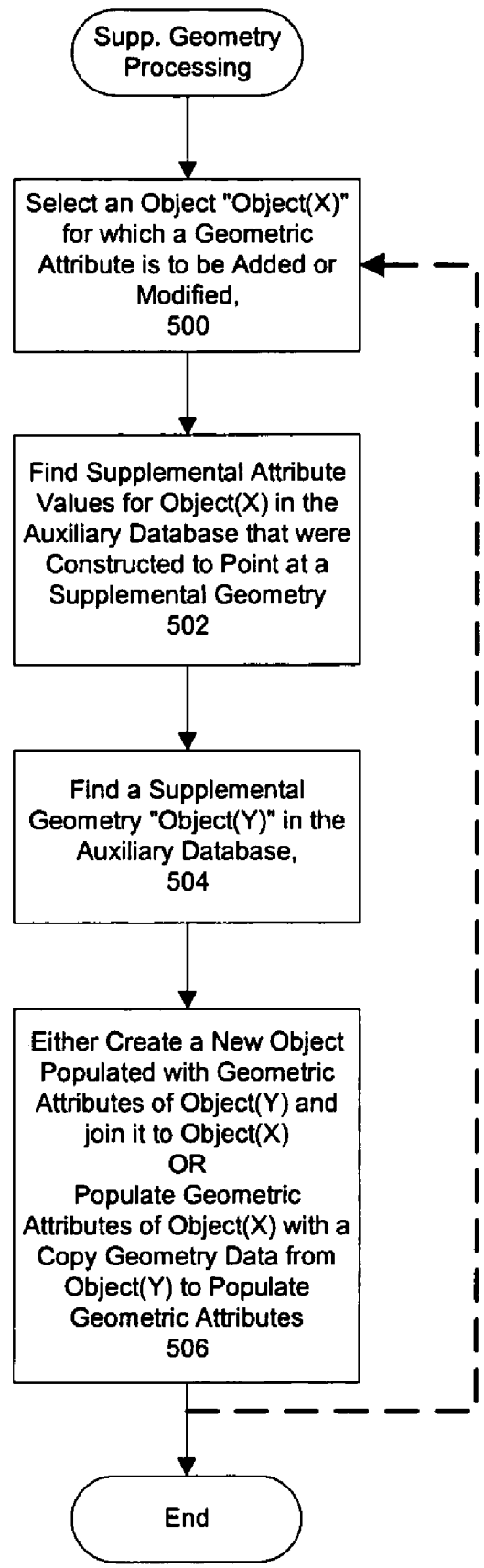
FIG. 5 is a flowchart describing additional details of an exemplary process embodying features and aspects hereof to process geometric information in the auxiliary database to update the target database after importation

FIG. 5 is a flowchart describing exemplary processing to create geometric information in the target database similar to related geometric information derived from the source database and saved temporarily in the auxiliary database during the importation process. As described above in FIG. 3, supplemental geometric information may be derived from source objects during the importation thereof into the target database. However, the ordinary importation process may not allow direct association of the geometric information to the desired object in the target database. Rather, the importation process as described above in FIG. 3 saves such geometric information in the auxiliary database as supplemental geometry. Upon completion of the importation processing as described in FIG. 3 processing of FIG. 5 then processes such supplemental geometric information for selected objects in the target database. Element 500 is first operable to select a next object (Object(X)) for which geometric attribute information is to be added or modified in the target database. Object(X) is selected as a next object from a set of objects in the target database. Such criteria for selection may be geographic location, object class, date imported, other attribute information, a combination of criteria or any similar standard. Element 502 is then operable to locate supplemental geometric attribute values for Object(X) in the auxiliary database. Element 504 then locates a supplemental geometry object (Object(Y)) in the auxiliary database.

Element 506 is then operable to perform appropriate processing for the geometric attribute information so located. Although the format and semantic content of the supplemental information in the auxiliary database may be substantially standardized, those of ordinary skill in the art will recognize the utility of customizing the processing of element 506 for the particular source databases and target database utilized in a particular application environment. Particular exemplary formats and processing are discussed above with respect to particular, common, GIS application database importation structures and processes. For example, example 2 of the preferred embodiments employs a Magik code method that relocates a portion of geometric text. Another such Magik method might be employed in other circumstances to create a new object in the target database that contains a geometric text and attach this object to an existing object, rather than to modify an existing text attribute of the object.

Iterative repetition of the processing of FIG. 5 (as indicated by the darker dashed arrow) performs similar processing for each object in the target database until all geometric information identified by supplemental attribute information in the auxiliary database have been recreated in the target database.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A computing system implemented method comprising:
   translating, by operation of the computing system, information from a source database into a target database;
   generating, by operation of the computing system, supplemental information in an auxiliary database as a by-product of the step of translating; and
   updating, by operation of the computing system, information in the target database based upon the supplemental information in the auxiliary database,
   wherein the supplemental information comprises a plurality of instances of one or more of:
      supplemental attributes of objects in the target database that are not defined in a target data model that defines the structure of the target database; and
      one or more alternative instances of attribute values for a particular object/attribute pair in the target database, and
   wherein the supplemental information is generated as a by-product in that the supplemental information:
      is generated during the step of translating as the information in the source database is translated into the target database, and/or
      is generated based on attribute data in the target database which is created upon insertion of objects in the target database,
   wherein the step of generating further comprises generating, by operation of the computing system, one or more of: source join information related to joins between information in the source database, source geometry information related to geometric information in the source database, source attribute information, and information describing circumstances of the translation, and
   wherein the step of updating further comprises one or more of the steps of:
      adding, by operation of the computing system, target join information to the target database based upon the source join information in the auxiliary database;
      adding, by operation of the computing system, target geometry information, to the target database based upon the source geometry information in the auxiliary database;
      modifying, by operation of the computing system, the target database based upon the source attribute information in the auxiliary database; and
      modifying, by operation of the computing system, the target database based upon the information in the auxiliary database describing circumstances of the translation.

2. The method of claim 1
   wherein the source database is implemented as one of: a database in Smallworld GIS (from General Electric Corp.), a database in Smallworld on Oracle (from General Electric Corp.), a database in ArcGIS (from ESRI Corp.), a database in AutoCAD (from Autodesk Corp.), or a database in FRAMME (from Intergraph Corp.), and
   wherein the target database is implemented as one of: a database in Smallworld GIS (from General Electric Corp.), a database in Smallworld on Oracle (from General Electric Corporation), a database in ArcGIS (from ESRI Corporation), a database in AutoCAD (from Autodesk Inc.), or a database in FRAMME (from Intergraph Corp.).

3. A computing system implemented method comprising:
   translating, by operation of the computing system, information from a source database into a target database;
   generating, by operation of the computing system, supplemental information in an auxiliary database as a by-product of the step of translating; and
   updating, by operation of the computing system, information in the target database based upon the supplemental information in the auxiliary database,
   wherein the supplemental information comprises a plurality of entities, each entry may be of a type including one or more of:
      a supplemental attribute of an object from the target database, in which for each such object and attribute, the supplemental attribute may take a value of any field type and the attribute may take a name that is distinct from any attribute name found in the table containing the object; and
      an auxiliary database object containing multiple fields, in which there are one or more fields whose type is a geometry type and one field containing the name of a class from the target database or containing other means for identifying such class and a field or fields containing the key field value or values of an object in the target database belonging to that class or containing other means for identifying such key field value or values,
   wherein an auxiliary database comprises one or more tables, within the target database and/or within another database distinct from the source and target databases, for holding supplemental information, and
   wherein the supplemental information is generated as a by-product in that the supplemental information:
      is generated during the step of translating as the information in the source database is translated into the target database, and/or
      is generated based on attribute data in the target database which is created upon insertion of objects in the target database,
   wherein the step of generating further comprises generating, by operation of the computing system, one or more of: source join information related to joins between information in the source database, source geometry information related to geometric information in the source database, source attribute information, and information describing circumstances of the translation, and wherein the step of updating further comprises one or more of the steps of:
- adding, by operation of the computing system, target join information to the target database based upon the source join information in the auxiliary database;
- adding, by operation of the computing system, target geometry information, to the target database based upon the source geometry information in the auxiliary database;
- modifying, by operation of the computing system, the target database based upon the source attribute information in the auxiliary database; and
- modifying, by operation of the computing system, the target database based upon the information in the auxiliary database describing circumstances of the translation.

4. The method of claim 3
wherein the source database is implemented as one of: a database in Smallworld GIS (from General Electric Corp.), a database in Smallworld on Oracle (from General Electric Corp.), a database in ArcGIS (from ESRI Corp.), a database in AutoCAD (from Autodesk Corp.), or a database in FRAMME (from Intergraph Corp.), and
wherein the target database is implemented as one of: a database in Smallworld GIS (from General Electric Corp.), a database in Smallworld on Oracle (from General Electric Corporation), a database in ArcGIS (from ESRI Corporation), a database in AutoCAD (from Autodesk Inc.), or a database in FRAMME (from Intergraph Corp.).

\* \* \* \* \*